US012572304B2

(12) United States Patent
Zhu et al.

(10) Patent No.: US 12,572,304 B2
(45) Date of Patent: Mar. 10, 2026

(54) LOW-LATENCY PROCESSING FOR UNMAP COMMANDS

(71) Applicant: Micron Technology, Inc., Boise, ID (US)

(72) Inventors: Na Zhu, Shanghai (CN); Ling Shi, Shanghai (CN); Bo Sun, Shanghai (CN); Huachen Li, Shanghai (CN); Qingyuan Wang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 528 days.

(21) Appl. No.: 17/758,332

(22) PCT Filed: Mar. 17, 2022

(86) PCT No.: PCT/CN2022/081447
§ 371 (c)(1),
(2) Date: Jul. 1, 2022

(87) PCT Pub. No.: WO2023/173363
PCT Pub. Date: Sep. 21, 2023

(65) Prior Publication Data
US 2024/0192888 A1      Jun. 13, 2024

(51) Int. Cl.
*G06F 3/06* (2006.01)
*G06F 13/42* (2006.01)

(52) U.S. Cl.
CPC .......... *G06F 3/0659* (2013.01); *G06F 3/0611* (2013.01); *G06F 3/0656* (2013.01); *G06F 3/0683* (2013.01); *G06F 2212/7207* (2013.01)

(58) Field of Classification Search
CPC .... G06F 3/0659; G06F 3/0611; G06F 3/0656; G06F 3/0683; G06F 3/061
See application file for complete search history.

(56) References Cited

U.S. PATENT DOCUMENTS

2015/0095605 A1    4/2015  Roberts et al.
2016/0364179 A1   12/2016  Tsai et al.
(Continued)

FOREIGN PATENT DOCUMENTS

CN        101371229 A      2/2009
CN        106030521 A     10/2016
(Continued)

OTHER PUBLICATIONS

"International Search Report and Written Opinion of the International Searching Authority," issued in connection with Int'l Appl. No. PCT/CN2022/081447, dated Dec. 15, 2022 (9 pages).

*Primary Examiner* — Kalpit Parikh
(74) *Attorney, Agent, or Firm* — Holland & Hart LLP

(57) ABSTRACT

Methods, systems, and devices for low-latency processing for unmap commands are described. A plurality of commands including one or more unmap commands and one or more other types of commands may be received from a device. The one or more unmap commands may be stored in a queue used for unmap commands and the other commands may be stored in another queue. Ready-to-transfer messages for the one or more unmap commands stored in the queue may be transmitted to the device. In response to the ready-to-transfer messages, one or more messages including data for executing the one or more unmap commands may be received and stored in a portion of a buffer used for unmap commands.

21 Claims, 8 Drawing Sheets

Receive a plurality of commands comprising a set of unmap commands and one or more second commands of a type different than the set of unmap commands — 705

Store the set of unmap commands in a first queue used for unmap commands and the one or more second commands in a second queue used for the one or more second commands — 710

Transmit a set of ready-to-transfer messages comprising a ready-to-transfer message for each unmap command of the set of unmap commands in the first queue — 715

Receive, in response to the set of ready-to-transfer messages, one or more messages comprising data for executing the set of unmap commands — 720

Store, in at least a portion of a buffer used for unmap commands, the data for executing the set of unmap commands obtained from the one or more messages — 725

700

(56)                    References Cited

U.S. PATENT DOCUMENTS

| | | | |
|---|---|---|---|
| 2019/0265909 A1* | 8/2019 | Frolikov | ............... G06F 3/0616 |
| 2020/0218470 A1* | 7/2020 | Cho | ....................... G06F 3/0679 |
| 2020/0264804 A1 | 8/2020 | La Fratta et al. | |
| 2020/0285413 A1* | 9/2020 | Uchida | ................. G06F 3/0659 |
| 2021/0034514 A1* | 2/2021 | Cho | .................... G06F 9/30047 |
| 2021/0042060 A1 | 2/2021 | Kim | |

FOREIGN PATENT DOCUMENTS

| | | |
|---|---|---|
| CN | 112346650 A | 2/2021 |
| WO | 2007/043999 A1 | 4/2007 |

* cited by examiner

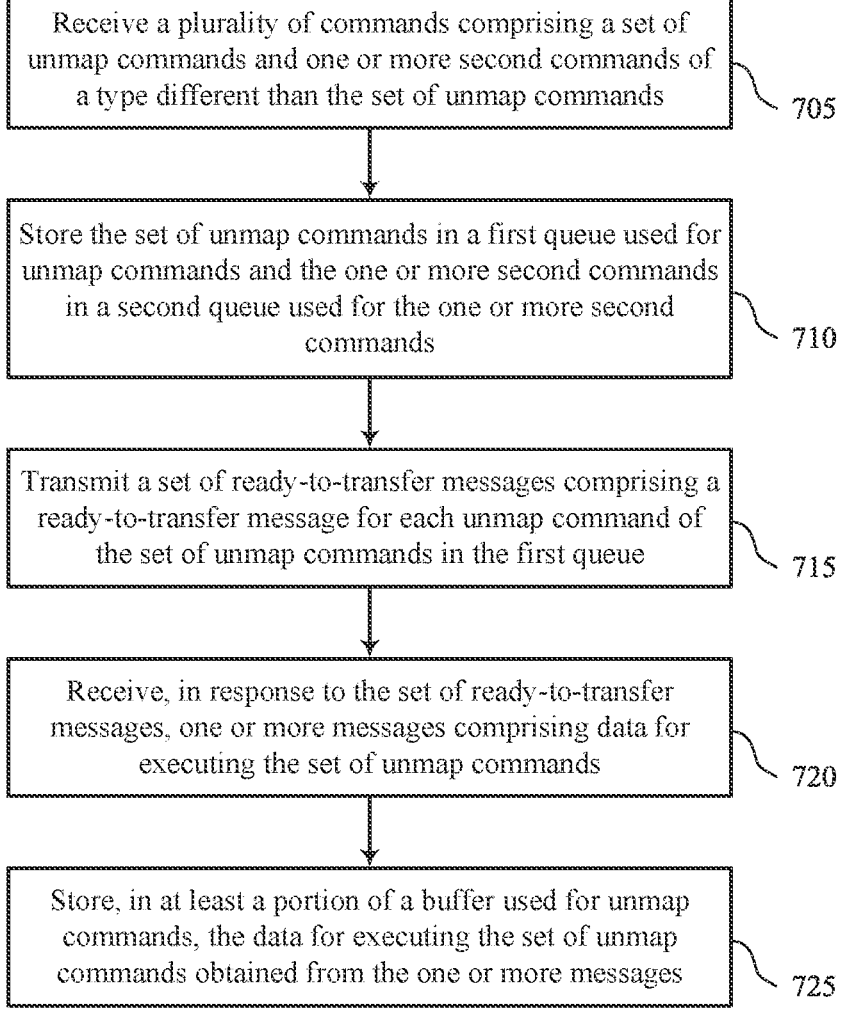

Receive a plurality of commands comprising a set of unmap commands and one or more second commands of a type different than the set of unmap commands

705

Store the set of unmap commands in a first queue used for unmap commands and the one or more second commands in a second queue used for the one or more second commands

710

Transmit a set of ready-to-transfer messages comprising a ready-to-transfer message for each unmap command of the set of unmap commands in the first queue

715

Receive, in response to the set of ready-to-transfer messages, one or more messages comprising data for executing the set of unmap commands

720

Store, in at least a portion of a buffer used for unmap commands, the data for executing the set of unmap commands obtained from the one or more messages

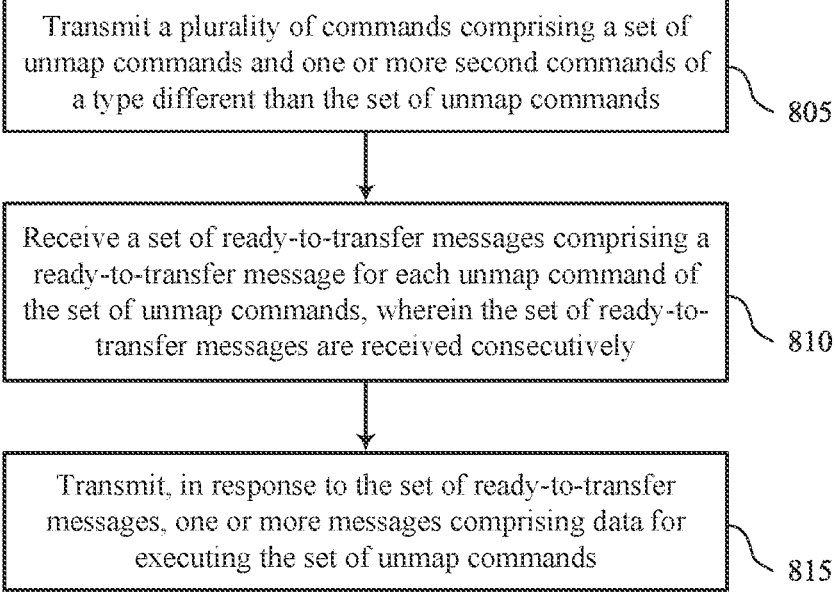

Transmit a plurality of commands comprising a set of unmap commands and one or more second commands of a type different than the set of unmap commands

805

Receive a set of ready-to-transfer messages comprising a ready-to-transfer message for each unmap command of the set of unmap commands, wherein the set of ready-to-transfer messages are received consecutively

810

Transmit, in response to the set of ready-to-transfer messages, one or more messages comprising data for executing the set of unmap commands

LOW-LATENCY PROCESSING FOR UNMAP COMMANDS

CROSS REFERENCE

The present Application for Patent is a 371 national phase filing of International Patent Application No. PCT/CN2022/081447 by ZHU et al., entitled "LOW-LATENCY PROCESSING FOR UNMAP COMMANDS," filed Mar. 17, 2022, assigned to the assignee hereof, and expressly incorporated by reference herein.

FIELD OF TECHNOLOGY

The following relates to one or more systems for memory, including low-latency processing for unmap commands.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

BRIEF DESCRIPTION OF THE DRAWINGS

FIGS. 7 and 8 show flowcharts illustrating a method or methods that support low-latency processing for unmap commands in accordance with examples as disclosed herein.

DETAILED DESCRIPTION

Certain types of commands (including unmap commands) that are received at a memory system may be stored in a single queue—e.g., in the order in which the commands are received. In some examples, the memory system may execute the commands in a one-by-one fashion and in the order in which the commands were received (e.g., in a first in, first out order).

Executing a set of commands that is stored in a queue in a one-by-one fashion and in an order in which the set of commands are received, may increase the latency associated with executing the set of commands. In some examples, a latency for executing a command in the queue may be increased based on a position of the command in the queue—e.g., a latency for executing a command may be increased if a number of other commands are positioned earlier in the queue. For some types of commands, the increased latency may exceed a threshold duration, which may reduce performance, result in errors, or both. The threshold duration may be associated with a duration that a host system expects or desires for a command to be completed relative to a time the host system sends the command.

To improve a latency associated with time-sensitive commands, operations for identifying and moving time-sensitive commands to a different queue may be used. Additionally, operations for parallel processing of time-sensitive commands may be used. For example, the memory system may be configured to transmit a consecutive set of RTT packets for the time-sensitive commands stored in the different queue—e.g., without waiting for data packets corresponding to the RTT packets to be transferred in between the consecutive set of RTT packets.

Features of the disclosure are initially described in the context of systems that support low-latency processing for unmap commands. Features of the disclosure are also described in the context of a subsystem and data flow diagram. These and other features of the disclosure are further illustrated by and described in the context of an apparatus diagram and flowchart that relate to low-latency processing for unmap commands.

Figure 1:
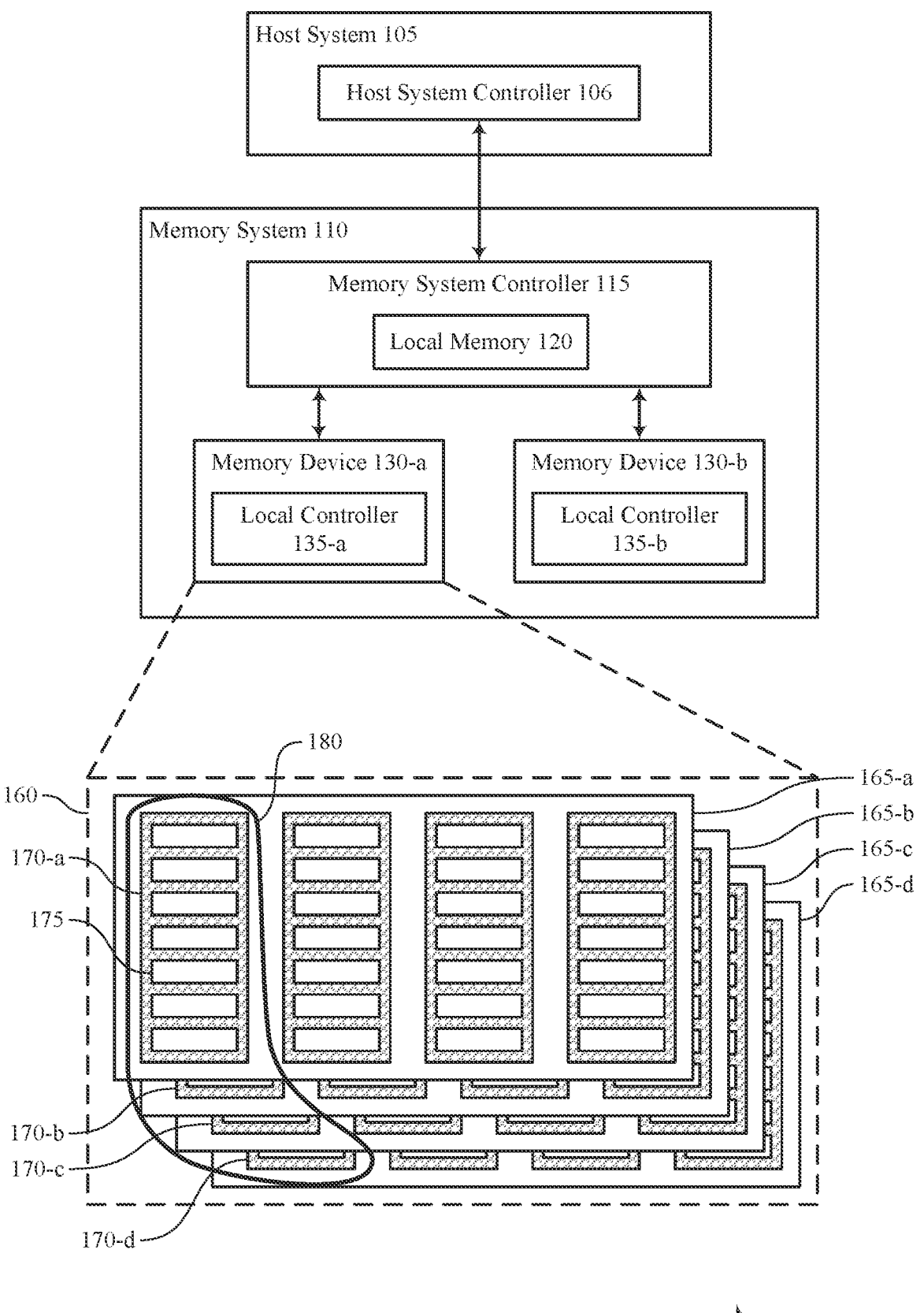
FIG. 1 illustrates an example of a system that supports low-latency processing for unmap commands in accordance with examples as disclosed herein.

FIG. 1 illustrates an example of a system 100 that supports low-latency processing for unmap commands in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180.

In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases. NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. For example, a page validity table (PVT) may be maintained that indicates whether the data is valid or invalid (e.g., at a page level of granularity). Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support low-latency processing for unmap commands. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

Memory system 110 may receive, from host system 105, multiple commands including one or more unmap commands and one or more other types of commands. The memory system 110 (e.g., the memory system controller 115 at the memory system 110) may store the one or more unmap commands in a queue used for unmap commands and the other commands may be stored in another queue. The memory system 110 may also transmit, to host system 105, ready-to-transfer messages for the one or more unmap commands stored in the queue. In response to the ready-to-transfer messages, the memory system 110 may receive and store one or more messages including data for executing the one or more unmap commands in a portion of a buffer used for unmap commands.

Figure 2:
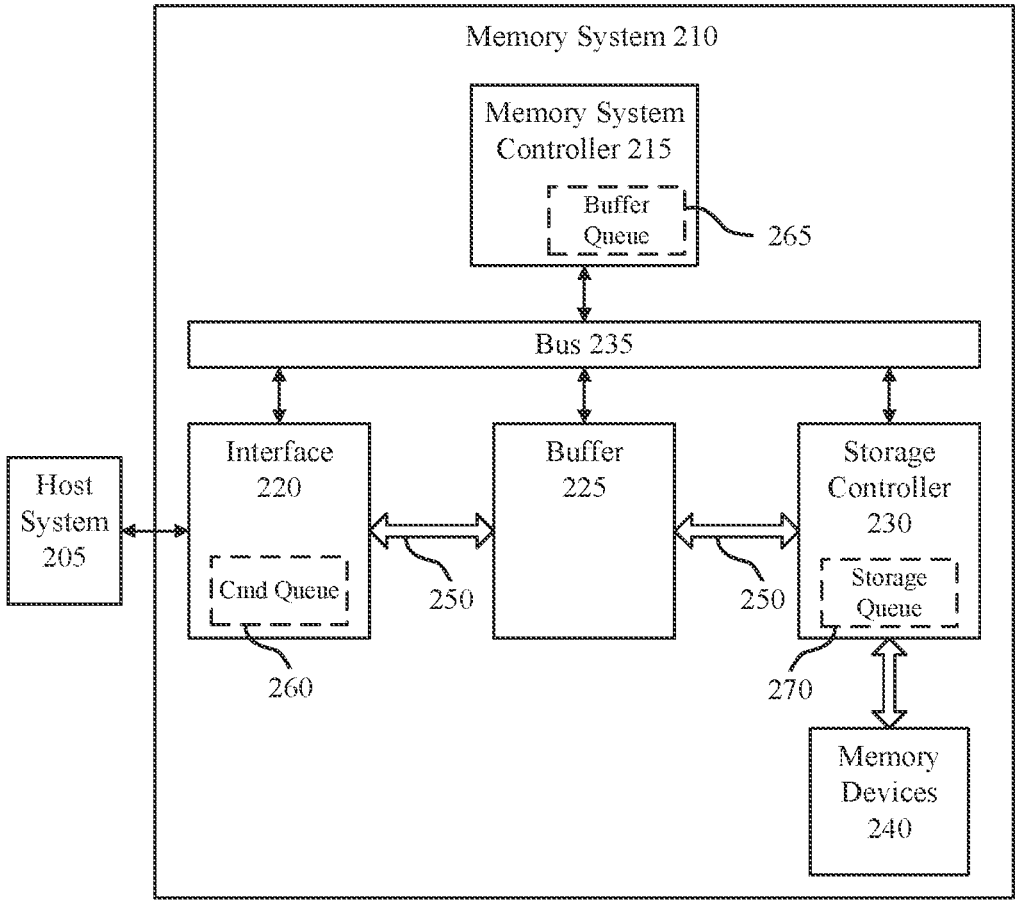
FIG. 2 illustrates an example of a system that supports low-latency processing for unmap commands in accordance with examples as disclosed herein.

FIG. 2 illustrates an example of a system 200 that supports low latency processing for unmap commands in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220. e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215. e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

A memory system 210 (e.g., memory system controller 215) may execute a set of commands received from host system 205 (e.g., from a host system controller of host system 205). The memory system 210 may store the received set of commands in a queue. Further, the memory system 210 may execute the set of commands stored in the queue in the order with which the set of commands were received from the host system 205. In some examples, the memory system 210 may not execute a next command in the queue until a current command has been fully executed— e.g., the commands may be executed on a one-by-one basis and in a first-in-first out order.

The set of commands may include read commands, write commands, unmap commands, memory management commands, etc. Unmap commands may be sent by host system 205 to indicate that data at a logical address (or range of logical addresses) will no longer be used by (e.g., has been invalidated by) the host system 205. In some examples, an unmap command may be a 4K unmap command. In such cases, an unmap length in an unmap command UPIU may be set to "1" to indicate that a 4 KB area is to be unmapped. In other examples, the unmap command is a non-4K unmap command. In response to receiving an unmap command, the memory system 210 may update a physical validity table to indicate that the data stored at physical addresses corresponding to the unmapped logical address(es) or no longer valid. Accordingly, the memory system 210 may erase and reset the memory cells to an initial state (e.g., to store all Is) at the unmapped logical address(es) during a garbage collection operation).

Executing a command may include loading the command from the queue and identifying the type of command. After identifying the type of command, the memory system 210 may determine whether the memory system 210 is ready to transfer (e.g., receive or transmit) data associated with the command—e.g., based on determining whether a memory device 240 is ready to be accessed. Once the memory system determines that the memory system 210 is ready to transfer data with the host system 205, the memory system may transmit a ready-to-transfer (RTT) packet. Based on the RTT packet being transmitted, the host system may transmit a data packet—e.g., DATA OUT UPIU—including the data associated with the command. Alternatively, the memory system 210 may transmit a data packet (e.g., DATA IN UPIU) including the data associated with the command. In examples where the command is an unmap command, the host system 205 may transmit a data packet that includes an indication of a set of logical addresses that have been unmapped by the host system 205. After transferring the data packet, the memory system 210 may load a next command from the queue and repeat the operations described above.

Executing a set of commands that is stored in a queue in a one-by-one fashion and in an order in which the set of commands are received, may increase the latency associated with executing the set of commands. In some examples, a latency for executing a command in the queue may be increased based on a position of the command in the queue—e.g., a latency for executing a command may be increased if a number of other commands are each executed before the command. For some types of commands, the increased latency may exceed a threshold duration, which may reduce performance, result in errors, or both. The threshold duration may be associated with a duration that a host system 205 expects or desires for a command to be completed relative to a time the host system 205 sends the command.

To improve a latency associated with time-sensitive commands, operations for identifying and moving time-sensitive commands (e.g., unmap commands) to a different queue may be used. Additionally, operations for parallel processing of the time-sensitive commands may be used. For example, the memory system 210 may be configured to transmit a consecutive set of RTT packets for the time-sensitive commands stored in the different queue—e.g., without waiting for the corresponding data packets to be transmitted or received in between the consecutive set of RTT packets. Grouping RTT packets for unmap commands may improve the performance of the memory system.

In some examples, memory system controller 215 receives multiple commands from host system 205. The commands may include a set of (e.g., one or more) unmap commands, read commands, write commands, query commands, verify commands, start/stop unit commands, and the like. Memory system controller 215 may store the unmap commands in a queue that is dedicated to unmap commands (which may be referred to as an unmap queue). The other commands may be stored in other queues—e.g., the read commands may be stored in a read queue, the write commands may be stored in a write queue, and the other commands may be stored in a shared queue. Based on storing the unmap commands in the unmap queue, memory system controller 215 may transmit a set of consecutive RTT packets to the host system, where each RTT packet of the set of RTT packets may correspond to an unmap command of the set of unmap commands. In some examples, memory system controller 215 transmits the RTT packets to the host system 205 based on the quantity of unmap commands in the unmap queue reaching a threshold.

In response to transmitting the RTT packets, the memory system controller 215 may receive one or more data messages (e.g., DATA OUT UPIUs) from the host system 205. In some examples, the memory system controller 215 may transmit multiple (e.g., all) of the RTT packets before receiving the one or more data messages from the host system 205. In some examples, the memory system controller 215 receives a single data message from the host system 205 that is responsive to the multiple RTT packets. In other examples, the memory system controller 215 receives multiple data messages from the host system, each data message being responsive to a corresponding RTT packet. The one or more data messages may include an indication of one or more sets of logical addresses that have been unmapped by the host system 205. The memory system controller 215 may store the indications of the one or more sets of logical addresses in a portion of a buffer dedicated to data received for unmap commands. Based on storing the unmap data in the unmap portion of the buffer, the memory system controller 215 may execute the unmap commands, invaliding data stored at physical addresses corresponding to the unmapped sets of logical addresses.

By storing unmap commands in a dedicated buffer and transmitting consecutive RTT packets for the unmap commands in the dedicated buffer, an unmap performance of the memory system 210 may be increased. That is, based on storing the unmap commands in the dedicated buffer, unmap commands may be grouped together. And based on transmitting multiple, consecutive RTT packets for the unmap commands, the unmap commands may be processed in parallel and a latency associated with executing the unmap commands may be reduced.

Figure 3A:
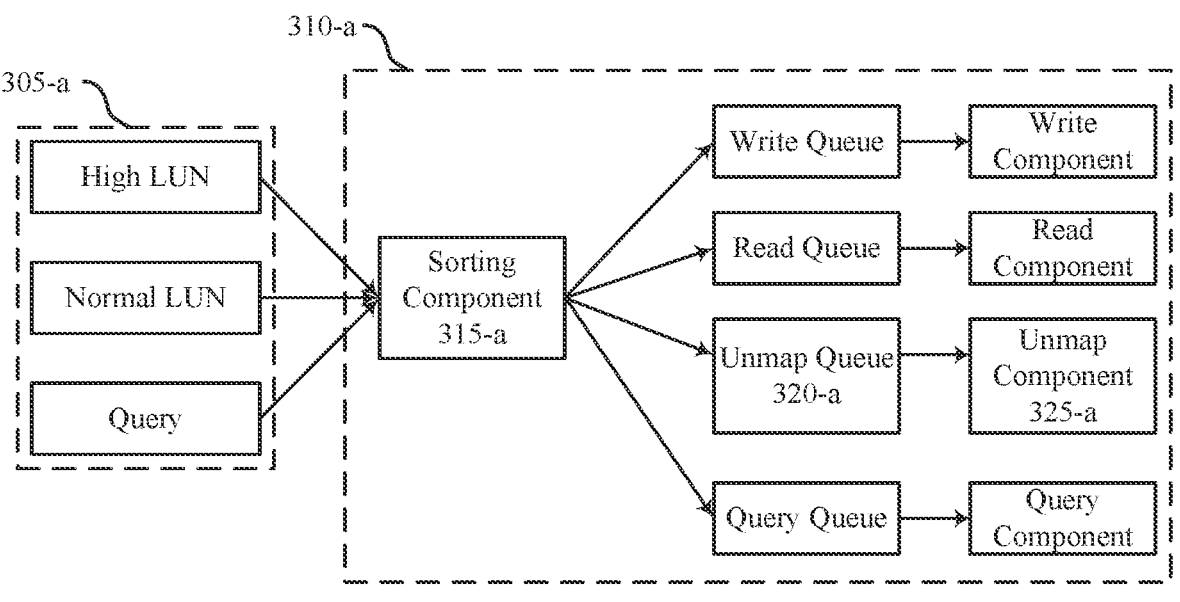
FIG. 3A illustrates an example of a subsystem that supports low-latency processing for unmap commands in accordance with examples as disclosed herein.

FIG. 3A illustrates an example of a subsystem that supports low-latency processing for unmap commands in accordance with examples as disclosed herein.

Subsystem 300-a includes hardware component 305-a and firmware component 310-a. Subsystem 300-a may be included within a host system, such as host system 205 of FIG. 2 or a memory system, such as memory system 210 of FIG. 2.

Among other components, hardware component 305-a may include logical units of varying priority, query components. Commands may be sent from hardware component 305-a to firmware component 310-a—e.g., based on the relative priority of the commands obtained at hardware component 305-a.

Sorting component 315-a may be configured to process the commands received from hardware component 305-a. Sorting component 315-a may identify write commands, read commands, verify commands, start/stop unit commands, unmap commands, query commands, etc. In some examples, read commands and write commands may be stored in dedicated queues while other commands (e.g., verify commands, start/stop unit commands, and unmap commands) may be stored in a single queue. As described herein, storing unmap commands in a same queue as other commands may delay the execution of the unmap commands—e.g., because of the one-by-one execution of commands in a queue.

As described herein, to decrease a latency for executing unmap commands, firmware component 310-a may be configured to include unmap queue 320-a, which may be dedicated to storing unmap commands identified in the commands received from hardware component 305-a. Unmap queue 320-a may store a quantity of unmap commands—e.g., up to thirty-two unmap commands.

Unmap component 325-a may be configured to execute the unmap commands stored in unmap queue 320-a. To further decrease latency for executing unmap commands, unmap component 325-*a* may be configured to transmit successive RTT messages for the unmap commands (e.g., all of the unmap commands) stored in unmap queue 320-*a*. In some examples, unmap component 325-*a* may transmit multiple (e.g., all) of the successive RTT messages prior to receiving, from a host system, a data packet (e.g., a DATA OUT UPIU) in response to the RTT messages—e.g., before receiving a response to an initial RTT message of the RTT messages. Unmap component 325-*a* may be configured to prioritize the transmission of the RTT messages for the unmap commands over the transmission of RTT messages for other commands (e.g., verify commands, start/stop unit commands, query commands, etc.). Unmap component 325-*a* may also be configured to transmit the RTT messages for the unmap commands stored in unmap queue 320-*a* based on the quantity of unmap messages stored in unmap queue 320-*a* reaching a threshold, based on an available capacity of the unmap queue falling below a threshold, based on the unmap queue 320-*a* being filled, based on a duration since a first unmap command was stored in unmap queue 320-*a* etc.

Based on transmitting the RTT messages, unmap component 325-*a* may receive one or more data packets from the host system. In some examples, the unmap component 325-*a* receives a corresponding data packet for each RTT message transmitted to the host system. The one or more data packets may indicate ranges of logical block addresses that have been unmapped by the host system. The unmap component 325-*a* may store the information received in the one or more data packets in a portion of a buffer that is dedicated to storing unmap information, as described in more detail herein, including with reference to FIG. 3B.

Figure 3B:
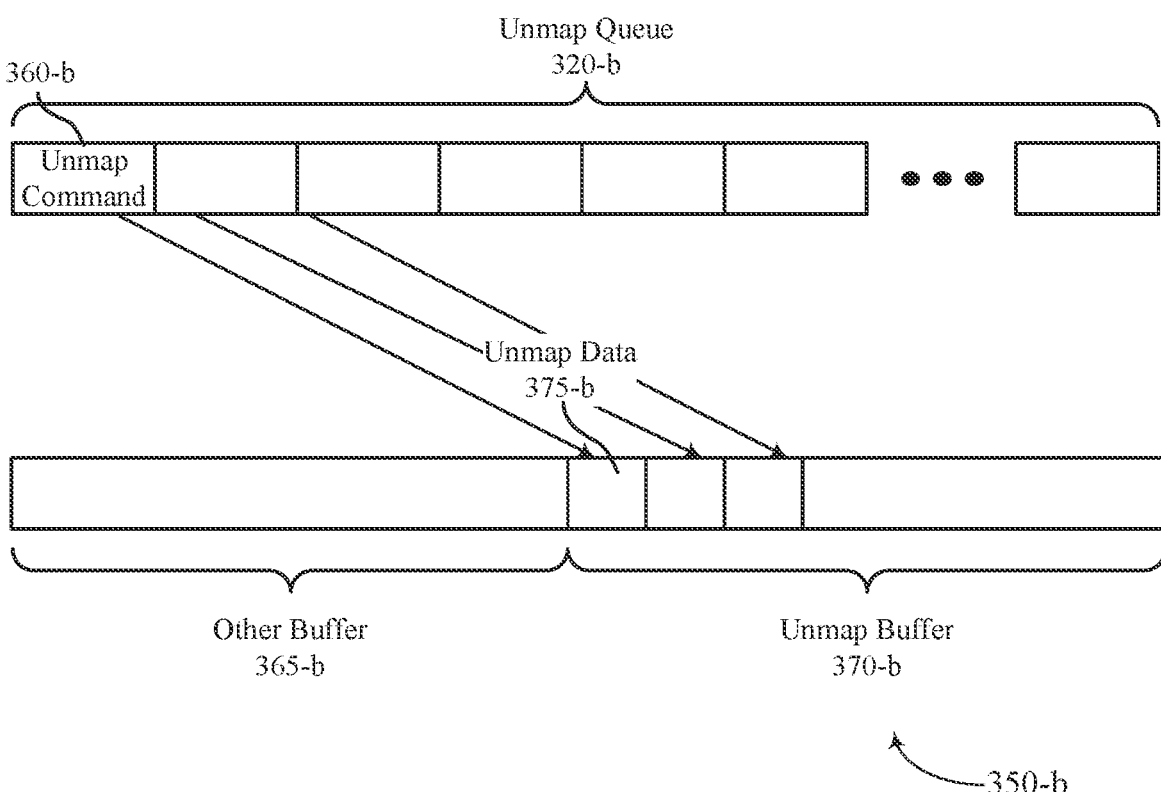
FIG. 3B illustrates an example of a data flow that supports low-latency processing for unmap commands in accordance with examples as disclosed herein.

FIG. 3B illustrates an example of a data flow that supports low-latency processing for unmap commands in accordance with examples as disclosed herein.

Data flow diagram 350-*b* depicts relationships between unmap commands (such as unmap command 360-*b*) stored in unmap queue 320-*b* and corresponding data stored in a portion of a static buffer dedicated to unmap information (e.g., unmap buffer 370-*b*). Unmap queue 320-*b* may be the same as or an example of unmap queue 320-*a* of FIG. 3A. A portion of the static buffer may be dedicated to data (e.g., input and output data) generated for other commands (e.g., other buffer 365-*b*) and another portion of the static buffer may be dedicated to data (e.g., input and output data) generated for other commands (e.g., unmap buffer 370-*b*). Other buffer 365-*b* may have a first size (e.g., 2 KB), and unmap buffer 370-*b* may have a second size (e.g., 2 KB). Static buffer may have a third size (e.g., 4 KB) that is based on the first size of other buffer 365-*b* and the second size of unmap buffer 370-*b*.

The unmap queue 320-*b* may store up to N unmap commands, including unmap command 360-*b*. In some examples, N equals thirty-two. A component (e.g., unmap component 325-*a*) may process the unmap commands stored in unmap queue 320-*b*, transmitting successive RTT messages for the unmap commands stored in unmap queue 320-*b*.

Based on transmitting the RTT messages, the component may receive one or more data packets from a host system, where the data packets may include an indication of sets of logical addresses that have been unmapped by the host system. Each set of logical addresses may correspond to one of the unmap commands stored in unmap queue 320-*b*. Additionally, each set of logical addresses may be stored in unmap buffer 370-*b*. For example, unmap data 375-*b* may include an indication of a first set of logical address unmapped by unmap command 360-*b*, and unmap data 375-*b* may be stored in a first position of unmap buffer 370-*b*. Similarly, second unmap data corresponding to the second unmap command stored in unmap queue 320-*b* may be stored in a second position of unmap buffer 370-*b*, and so on.

The component may then execute unmapping operations in accordance with the unmapped logical addresses in unmap buffer 370-*b*. The unmapping operations may include indicating, in a physical validity table, that physical addresses corresponding to the unmapped logical addresses no longer store valid data.

Figure 4:
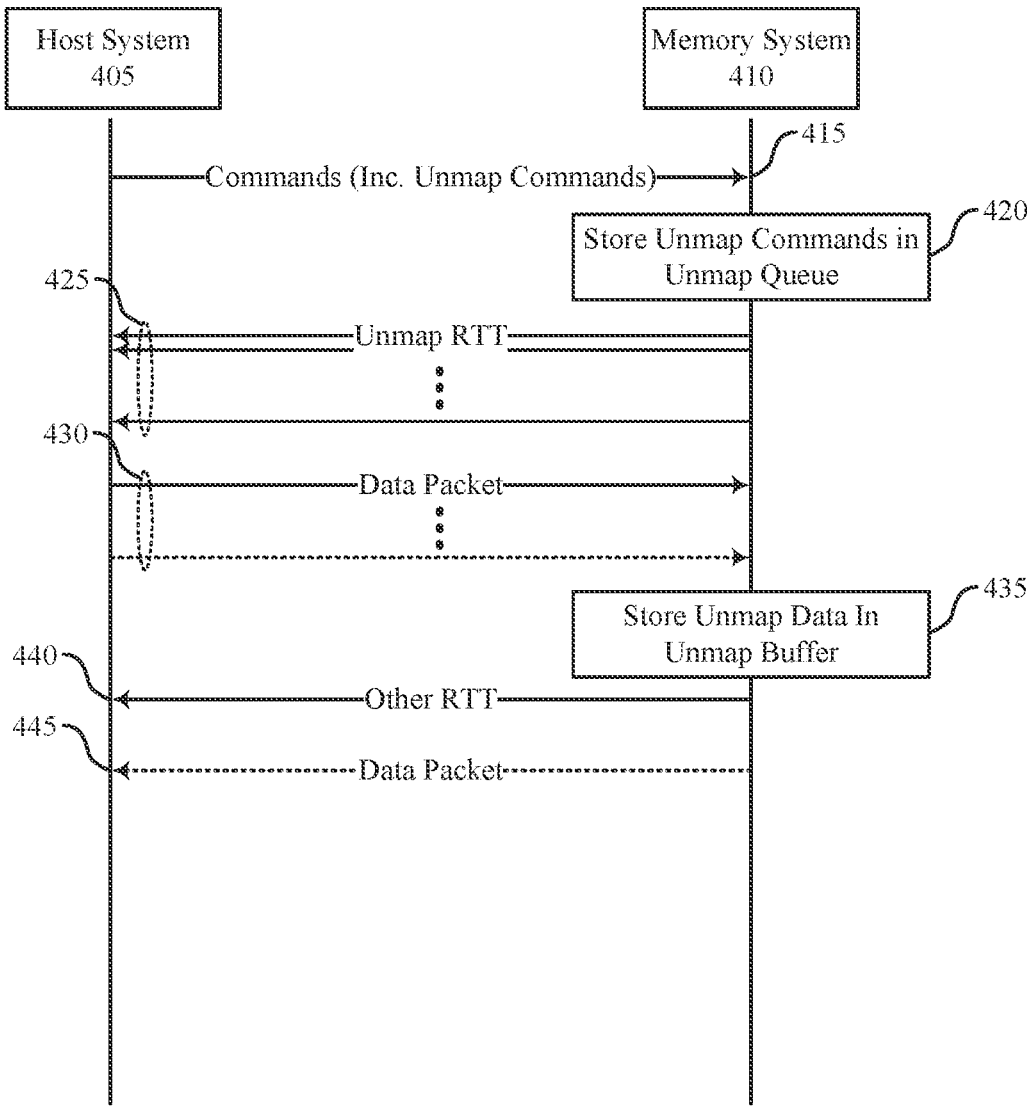
FIG. 4 illustrates an example of a set of operations that supports low-latency processing for unmap commands in accordance with examples as disclosed herein.

FIG. 4 illustrates an example of a set of operations that supports low-latency processing for unmap commands in accordance with examples as disclosed herein.

Process flow 400 may be performed by host system 405 and memory system 410, which may be respective examples of a host system and a memory system described herein. In some examples, process flow 400 illustrates an example set of operations performed to support low-latency processing for unmap commands. For example, process flow 400 may include operations for storing unmap commands in a dedicated unmap queue as well as for transmitting successive unmap RTT messages to a host system for the unmap commands stored in the unmap queue.

Aspects of the process flow 400 may be implemented by a controller, among other components. Additionally, or alternatively, aspects of the process flow 400 may be implemented as instructions stored in memory (e.g., firmware stored in a memory coupled with a controller). For example, the instructions, when executed by a controller (e.g., a memory system controller of memory system 410), may cause the controller to perform the operations of the process flow 400.

One or more of the operations described in process flow 400 may be performed earlier or later, omitted, replaced, supplemented, or combined with another operation. Also, additional operations described herein may replace, supplement or be combined with one or more of the operations described in process flow 400.

At 415, a set of commands may be received (e.g., by memory system 410). The set of commands may include read commands, write commands, verify commands, start/stop unit commands, unmap commands, query commands, and the like. In some examples, the unmap commands may be dispersed throughout (e.g., interspersed with) the set of commands.

At 420, the unmap commands may be stored in an unmap queue (e.g., unmap queue 320-*b* of FIG. 3B). The other commands received in the set of commands may be stored in other queues. For example, the read commands may be stored in a read queue, and the write commands may be stored in a write queue.

At 425, multiple RTT messages (which may be referred to as unmap RTT messages) may be sent (e.g., by memory system 410 or an unmap component in memory system 410, such as unmap component 325-*a* of FIG. 3A) for the unmap commands stored in the unmap queue. In some examples, memory system 410 sends the unmap RTT messages based on the quantity of unmap commands in the unmap queue reaching a threshold quantity (e.g., based on the unmap queue being filled). In some examples, memory system 410 sends the unmap RTT messages based on a first unmap command being stored in the unmap queue for a first threshold duration, a last unmap commands being stored in the unmap queue for a second threshold duration, or both.

At 430, one or more data packets (e.g., DATA OUT UPIUs) may be transmitted (e.g., by host system 405). The one or more data packets may include sets of unmapped logical addresses corresponding to the unmap commands stored in the unmap queue. In some examples, a single data packet indicates the sets of unmapped logical addresses. In other examples, a data packet corresponding to each unmap command is received, where each data packet indicates a set of unmapped logical addresses for the corresponding unmap command.

In some examples, transmission of the unmap RTTs are interspersed with the transmission of the data packets. In some examples, multiple unmap RTTs are received at host system 405 before the one or more data packets are transmitted to memory system 410.

At 435, the sets of unmapped logical addresses (which may be referred to as unmap data) may be stored (e.g., by memory system 410 or an unmap component of memory system 410) in an unmap buffer (e.g., such as unmap buffer 370-*b*). Based on storing the unmap data in the unmap buffer, memory system 410 may complete the unmap operations for the received unmap commands. Completing the unmap operations may include updating a physical validity table at memory system 410 to indicate that the data stored at the unmapped logical addresses is no longer valid.

At 440, an RTT message for another command of the set of commands received at memory system 410 may be transmitted. The other command may be a command that is different than an unmap command. In some examples, the other command is received earlier in the set of commands than one or more of the unmap commands. In such cases, the RTT message for the other command (e.g., a verify command or a start/stop unit command) may be transmitted after the unmap RTTs based on the unmap RTTs being prioritized over the other command.

At 445, a data packet (e.g., a DATA IN UPIU) may be obtained (e.g., at host system 405) based on the RTT message for the other command. By storing unmap commands in a dedicated unmap buffer, prioritizing the execution of unmap commands over other commands, and enabling successive unmap RTT message transmission, a latency for completely executing unmap commands received at memory system 410 may be reduced.

Figure 5:
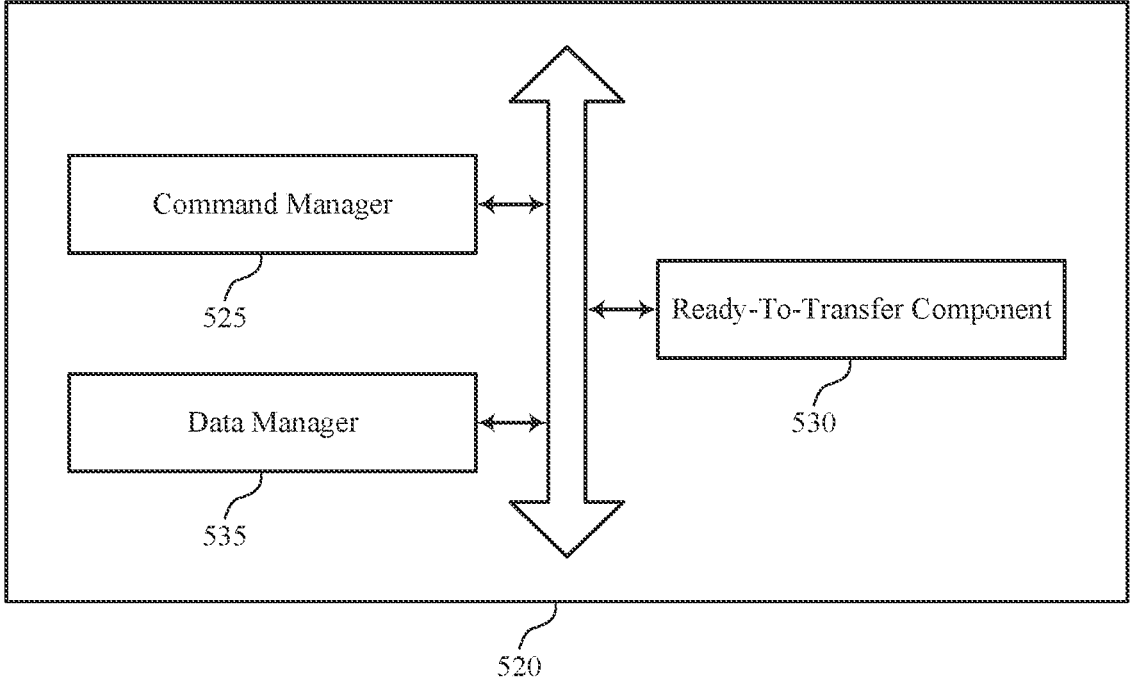
FIG. 5 shows a block diagram of a memory system that supports low-latency processing for unmap commands in accordance with examples as disclosed herein.

FIG. 5 shows a block diagram 500 of a memory system 520 that supports low-latency processing for unmap commands in accordance with examples as disclosed herein. The memory system 520 may be an example of aspects of a memory system as described with reference to FIGS. 1 through 4. The memory system 520, or various components thereof, may be an example of means for performing various aspects of low-latency processing for unmap commands as described herein. For example, the memory system 520 may include a command manager 525, a ready-to-transfer component 530, a data manager 535, or any combination thereof. Each of these components may communicate, directly or indirectly, with one another (e.g., via one or more buses).

The command manager 525 may be configured as or otherwise support a means for receiving a plurality of commands including a set of unmap commands and one or more second commands of a type different than the set of unmap commands. In some examples, the command manager 525 may be configured as or otherwise support a means for storing the set of unmap commands in a first queue used for unmap commands and the one or more second commands in a second queue used for the one or more second commands. The ready-to-transfer component 530 may be configured as or otherwise support a means for transmitting a set of ready-to-transfer messages including a ready-to-transfer message for each unmap command of the set of unmap commands in the first queue. The data manager 535 may be configured as or otherwise support a means for receiving, in response to the set of ready-to-transfer messages, one or more messages including data for executing the set of unmap commands. In some examples, the data manager 535 may be configured as or otherwise support a means for storing, in at least a portion of a buffer used for unmap commands, the data for executing the set of unmap commands obtained from the one or more messages.

In some examples, the set of unmap commands are interspersed with the one or more second commands. In some examples, transmitting the set of ready-to-transfer messages for the set of unmap commands includes transmitting the set of ready-to-transfer messages for the set of unmap commands consecutively.

In some examples, the ready-to-transfer component 530 may be configured as or otherwise support a means for transmit a second set of ready-to-transfer messages including a ready-to-transfer message for each second command of the one or more second commands, where a first order in which unmap commands of the set of unmap commands and second commands of the one or more second commands are received is different than a second order in which corresponding ready-to-transfer messages of the set of ready-to-transfer messages for the set of unmap commands and the second set of ready-to-transfer messages for the one or more second commands are transmitted.

In some examples, transmitting the set of ready-to-transfer messages for the set of unmap commands includes transmitting the set of ready-to-transfer messages for the set of unmap commands before the second set of ready-to-transfer messages for the one or more second commands.

In some examples, the one or more messages includes a single message including the data corresponding to the set of ready-to-transfer messages.

In some examples, the one or more messages includes a plurality of messages including the data in a plurality of data packets, the plurality of messages corresponding to the set of ready-to-transfer messages.

In some examples, multiple ready-to-transfer messages of the set of ready-to-transfer messages are transmitted prior to receiving a message of the one or more messages.

In some examples, the command manager 525 may be configured as or otherwise support a means for determining that a quantity of unmap commands in the first queue satisfies a threshold, where the set of ready-to-transfer messages for the set of unmap commands is transmitted based at least in part on the quantity of unmap commands satisfying the threshold.

In some examples, the command manager 525 may be configured as or otherwise support a means for determining that the set of unmap commands has been stored in the first queue for a threshold duration, where the set of ready-to-transfer messages for the set of unmap commands is transmitted based at least in part on one or more unmap commands of the set of unmap commands being stored in the first queue for the threshold duration.

In some examples, the command manager 525 may be configured as or otherwise support a means for identifying, based at least in part on receiving the plurality of commands, the set of unmap commands within the plurality of commands, where the set of unmap commands is stored in the first queue based at least in part on the identifying.

In some examples, the one or more messages include one or more DATA OUT UPIUs.

Figure 6:
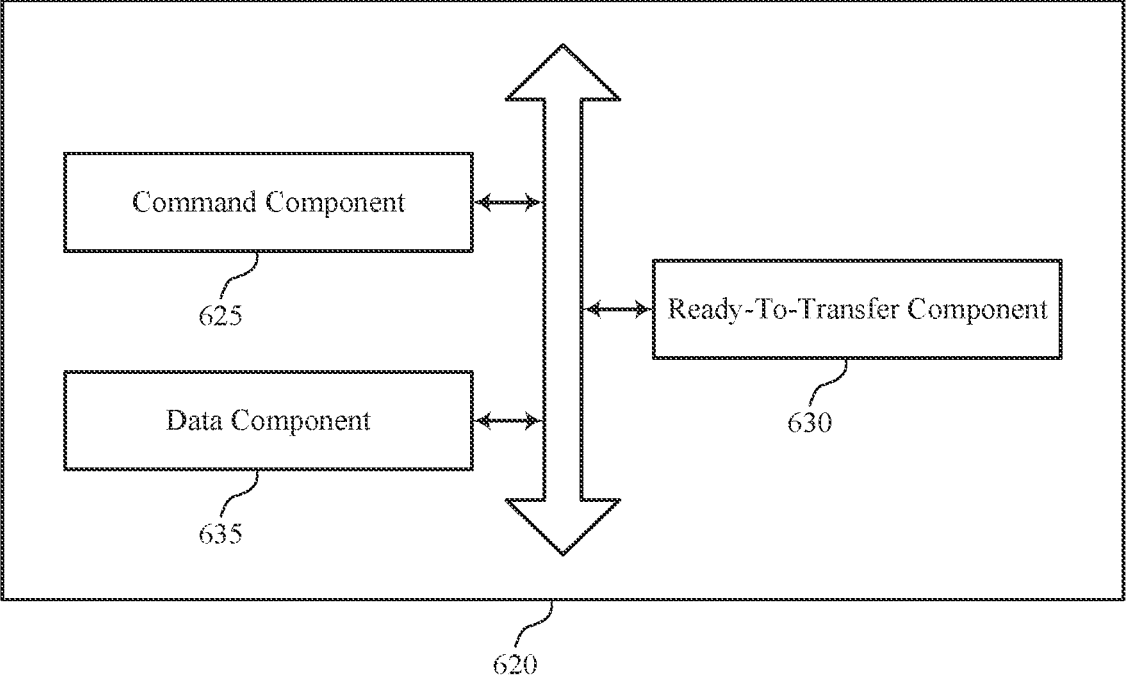
FIG. 6 shows a block diagram of a host system that supports low-latency processing for unmap commands in accordance with examples as disclosed herein.

FIG. 6 shows a block diagram 600 of a host system 620 that supports low-latency processing for unmap commands in accordance with examples as disclosed herein. The host system 620 may be an example of aspects of a host system as described with reference to FIGS. 1 through 4. The host system 620, or various components thereof, may be an example of means for performing various aspects of low-latency processing for unmap commands as described herein. For example, the host system 620 may include a command component 625, a ready-to-transfer component 630, a data component 635, or any combination thereof. Each of these components may communicate, directly or indirectly, with one another (e.g., via one or more buses).

The command component 625 may be configured as or otherwise support a means for transmitting a plurality of commands including a set of unmap commands and one or more second commands of a type different than the set of unmap commands. The ready-to-transfer component 630 may be configured as or otherwise support a means for receiving a set of ready-to-transfer messages including a ready-to-transfer message for each unmap command of the set of unmap commands, where the set of ready-to-transfer messages are received consecutively. The data component 635 may be configured as or otherwise support a means for transmitting, in response to the set of ready-to-transfer messages, one or more messages including data for executing the set of unmap commands.

In some examples, multiple ready-to-transfer messages of the set of ready-to-transfer messages are received prior to the one or more messages being transmitted.

In some examples, to support transmitting the one or more messages, the data component 635 may be configured as or otherwise support a means for transmitting the one or more messages after receiving each ready-to-transfer message of the set of ready-to-transfer messages.

In some examples, the ready-to-transfer component 630 may be configured as or otherwise support a means for receiving a second set of ready-to-transfer messages including a ready-to-transfer message for each second command of the one or more second commands, where unmap commands of the set of unmap commands and second commands of the one or more second commands are transmitted in a first order, and where the first order is different than a second order in which corresponding ready-to-transfer messages of the set of ready-to-transfer messages for the set of unmap commands and the second set of ready-to-transfer messages for the one or more second commands are received.

In some examples, the ready-to-transfer component 630 may be configured as or otherwise support a means for identifying a last ready-to-transfer message of the set of ready-to-transfer messages, where the one or more messages are transmitted based at least in part identifying the last ready-to-transfer message.

In some examples, the ready-to-transfer component 630 may be configured as or otherwise support a means for identifying the last ready-to-transfer message of the set of ready-to-transfer messages based at least in part on a threshold quantity of ready-to-transfer messages of the set of ready-to-transfer messages, an interval between the ready-to-transfer messages of the set of ready-to-transfer messages, or both.

FIG. 7 shows a flowchart illustrating a method 700 that supports low-latency processing for unmap commands in accordance with examples as disclosed herein. The operations of method 700 may be implemented by a memory system or its components as described herein. For example, the operations of method 700 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 705, the method may include receiving a plurality of commands including a set of unmap commands and one or more second commands of a type different than the set of unmap commands. The operations of 705 may be performed in accordance with examples as disclosed herein. In some examples, aspects of the operations of 705 may be performed by a command manager 525 as described with reference to FIG. 5.

At 710, the method may include storing the set of unmap commands in a first queue used for unmap commands and the one or more second commands in a second queue used for the one or more second commands. The operations of 710 may be performed in accordance with examples as disclosed herein. In some examples, aspects of the operations of 710 may be performed by a command manager 525 as described with reference to FIG. 5.

At 715, the method may include transmitting a set of ready-to-transfer messages including a ready-to-transfer message for each unmap command of the set of unmap commands in the first queue. The operations of 715 may be performed in accordance with examples as disclosed herein. In some examples, aspects of the operations of 715 may be performed by a ready-to-transfer component 530 as described with reference to FIG. 5.

At 720, the method may include receiving, in response to the set of ready-to-transfer messages, one or more messages including data for executing the set of unmap commands. The operations of 720 may be performed in accordance with examples as disclosed herein. In some examples, aspects of the operations of 720 may be performed by a data manager 535 as described with reference to FIG. 5.

At 725, the method may include storing, in at least a portion of a buffer used for unmap commands, the data for executing the set of unmap commands obtained from the one or more messages. The operations of 725 may be performed in accordance with examples as disclosed herein. In some examples, aspects of the operations of 725 may be performed by a data manager 535 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a plurality of commands including a set of unmap commands and one or more second commands of a type different than the set of unmap commands: storing the set of unmap commands in a first queue used for unmap commands and the one or more second commands in a second queue used for the one or more second commands; transmitting a set of ready-to-transfer messages including a ready-to-transfer message for each unmap command of the set of unmap commands in the first queue: receiving, in response to the set of ready-to-transfer messages, one or more messages including data for executing the set of unmap commands: and storing, in at least a portion of a buffer used for unmap commands, the data for executing the set of unmap commands obtained from the one or more messages.

Aspect 2: The method, apparatus, or non-transitory computer-readable medium of aspect 1 where the set of unmap commands are interspersed with the one or more second commands and transmitting the set of ready-to-transfer messages for the set of unmap commands includes transmitting the set of ready-to-transfer messages for the set of unmap commands consecutively.

Aspect 3: The method, apparatus, or non-transitory computer-readable medium of any of aspects 1 through 2, further including operations, features, circuitry, logic, means, or instructions, or any combination thereof for transmit a second set of ready-to-transfer messages including a ready-to-transfer message for each second command of the one or more second commands, where a first order in which unmap commands of the set of unmap commands and second commands of the one or more second commands are received is different than a second order in which corresponding ready-to-transfer messages of the set of ready-to-transfer messages for the set of unmap commands and the second set of ready-to-transfer messages for the one or more second commands are transmitted.

Aspect 4: The method, apparatus, or non-transitory computer-readable medium of aspect 3 where transmitting the set of ready-to-transfer messages for the set of unmap commands includes transmitting the set of ready-to-transfer messages for the set of unmap commands before the second set of ready-to-transfer messages for the one or more second commands.

Aspect 5: The method, apparatus, or non-transitory computer-readable medium of any of aspects 1 through 4 where the one or more messages includes a single message including the data corresponding to the set of ready-to-transfer messages.

Aspect 6: The method, apparatus, or non-transitory computer-readable medium of any of aspects 1 through 5 where the one or more messages includes a plurality of messages including the data in a plurality of data packets, the plurality of messages corresponding to the set of ready-to-transfer messages.

Aspect 7: The method, apparatus, or non-transitory computer-readable medium of any of aspects 1 through 6 where multiple ready-to-transfer messages of the set of ready-to-transfer messages are transmitted prior to receiving a message of the one or more messages.

Aspect 8: The method, apparatus, or non-transitory computer-readable medium of any of aspects 1 through 7, further including operations, features, circuitry, logic, means, or instructions, or any combination thereof for determining that a quantity of unmap commands in the first queue satisfies a threshold, where the set of ready-to-transfer messages for the set of unmap commands is transmitted based at least in part on the quantity of unmap commands satisfying the threshold.

Aspect 9: The method, apparatus, or non-transitory computer-readable medium of any of aspects 1 through 8, further including operations, features, circuitry, logic, means, or instructions, or any combination thereof for determining that the set of unmap commands has been stored in the first queue for a threshold duration, where the set of ready-to-transfer messages for the set of unmap commands is transmitted based at least in part on one or more unmap commands of the set of unmap commands being stored in the first queue for the threshold duration.

Aspect 10: The method, apparatus, or non-transitory computer-readable medium of any of aspects 1 through 9, further including operations, features, circuitry, logic, means, or instructions, or any combination thereof for identifying, based at least in part on receiving the plurality of commands, the set of unmap commands within the plurality of commands, where the set of unmap commands is stored in the first queue based at least in part on the identifying.

Aspect 11: The method, apparatus, or non-transitory computer-readable medium of any of aspects 1 through 10 where the one or more messages include one or more DATA OUT UPIUS.

FIG. 8 shows a flowchart illustrating a method 800 that supports low-latency processing for unmap commands in accordance with examples as disclosed herein. The operations of method 800 may be implemented by a host system or its components as described herein. For example, the operations of method 800 may be performed by a host system as described with reference to FIGS. 1 through 4 and 6. In some examples, a host system may execute a set of instructions to control the functional elements of the device to perform the described functions. Additionally, or alternatively, the host system may perform aspects of the described functions using special-purpose hardware.

At 805, the method may include transmitting a plurality of commands including a set of unmap commands and one or more second commands of a type different than the set of unmap commands. The operations of 805 may be performed in accordance with examples as disclosed herein. In some examples, aspects of the operations of 805 may be performed by a command component 625 as described with reference to FIG. 6.

At 810, the method may include receiving a set of ready-to-transfer messages including a ready-to-transfer message for each unmap command of the set of unmap commands, where the set of ready-to-transfer messages are received consecutively. The operations of 810 may be performed in accordance with examples as disclosed herein. In some examples, aspects of the operations of 810 may be performed by a ready-to-transfer component 630 as described with reference to FIG. 6.

At 815, the method may include transmitting, in response to the set of ready-to-transfer messages, one or more messages including data for executing the set of unmap commands. The operations of 815 may be performed in accordance with examples as disclosed herein. In some examples, aspects of the operations of 815 may be performed by a data component 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 12: A method, apparatus, or non-transitory computer-readable medium including operations, features, circuitry, logic, means, or instructions, or any combination thereof for transmitting a plurality of commands including a set of unmap commands and one or more second commands of a type different than the set of unmap commands; receiving a set of ready-to-transfer messages including a ready-to-transfer message for each unmap command of the set of unmap commands, where the set of ready-to-transfer messages are received consecutively; and transmitting, in response to the set of ready-to-transfer messages, one or more messages including data for executing the set of unmap commands.

Aspect 13: The method, apparatus, or non-transitory computer-readable medium of aspect 12 where multiple ready-to-transfer messages of the set of ready-to-transfer messages are received prior to the one or more messages being transmitted.

Aspect 14: The method, apparatus, or non-transitory computer-readable medium of any of aspects 12 through 13 where transmitting the one or more messages includes operations, features, circuitry, logic, means, or instructions, or any combination thereof for transmitting the one or more messages after receiving each ready-to-transfer message of the set of ready-to-transfer messages.

Aspect 15: The method, apparatus, or non-transitory computer-readable medium of any of aspects 12 through 14, further including operations, features, circuitry, logic, means, or instructions, or any combination thereof for receiving a second set of ready-to-transfer messages including a ready-to-transfer message for each second command of the one or more second commands, where unmap commands of the set of unmap commands and second commands of the one or more second commands are transmitted in a first order, and where the first order is different than a second order in which corresponding ready-to-transfer messages of the set of ready-to-transfer messages for the set of unmap commands and the second set of ready-to-transfer messages for the one or more second commands are received.

Aspect 16: The method, apparatus, or non-transitory computer-readable medium of any of aspects 12 through 15, further including operations, features, circuitry, logic, means, or instructions, or any combination thereof for identifying a last ready-to-transfer message of the set of ready-to-transfer messages, where the one or more messages are transmitted based at least in part identifying the last ready-to-transfer message.

Aspect 17: The method, apparatus, or non-transitory computer-readable medium of aspect 16, further including operations, features, circuitry, logic, means, or instructions, or any combination thereof for identifying the last ready-to-transfer message of the set of ready-to-transfer messages based at least in part on a threshold quantity of ready-to-transfer messages of the set of ready-to-transfer messages, an interval between the ready-to-transfer messages of the set of ready-to-transfer messages, or both.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal: however, the signal may represent a bus of signals, where the bus may have a variety of bit widths.

The terms "electronic communication," "conductive contact." "connected." and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on." or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices; and
processing circuitry coupled with the one or more memory devices and configured to cause the memory system to:
    receive a plurality of commands comprising a plurality of unmap commands interspersed with one or more second commands of a type different than the plurality of unmap commands;
    store the plurality of unmap commands in a first queue used for unmap commands and the one or more second commands in a second queue used for the one or more second commands;
    transmit a plurality of ready-to-transfer messages consecutively, the plurality of ready-to-transfer messages comprising a ready-to-transfer message for each unmap command of the plurality of unmap commands in the first queue;
    receive, in response to the plurality of ready-to-transfer messages, one or more messages comprising data for executing the plurality of unmap commands; and
    store, in at least a portion of a buffer used for unmap commands, the data for executing the plurality of unmap commands obtained from the one or more messages.

2. The memory system of claim 1, wherein the processing circuitry is further configured to cause the memory system to:
    transmit a second plurality of ready-to-transfer messages comprising a ready-to-transfer message for each second command of the one or more second commands, wherein a first order in which unmap commands of the plurality of unmap commands and second commands of the one or more second commands are received is different than a second order in which corresponding ready-to-transfer messages of the plurality of ready-to-transfer messages for the plurality of unmap commands and the second plurality of ready-to-transfer messages for the one or more second commands are transmitted.

3. The memory system of claim 2, wherein, to transmit the plurality of ready-to-transfer messages for the plurality of unmap commands, the processing circuitry is further configured to cause the memory system to:
    transmit the plurality of ready-to-transfer messages for the plurality of unmap commands before the second plurality of ready-to-transfer messages for the one or more second commands.

4. The memory system of claim 1, wherein the one or more messages comprises a single message comprising the data corresponding to the plurality of ready-to-transfer messages.

5. The memory system of claim 1, wherein the one or more messages comprises a plurality of messages comprising the data in a plurality of data packets, the plurality of messages corresponding to the plurality of ready-to-transfer messages.

6. The memory system of claim 1, wherein multiple ready-to-transfer messages of the plurality of ready-to-transfer messages are transmitted prior to receiving a message of the one or more messages.

7. The memory system of claim 1, wherein the processing circuitry is further configured to cause the memory system to:
    determine that a quantity of unmap commands in the first queue satisfies a threshold, wherein the plurality of ready-to-transfer messages for the plurality of unmap commands is transmitted based at least in part on the quantity of unmap commands satisfying the threshold.

8. The memory system of claim 1, wherein the processing circuitry is further configured to cause the memory system to:
    determine that the plurality of unmap commands has been stored in the first queue for a threshold duration, wherein the plurality of ready-to-transfer messages for the plurality of unmap commands is transmitted based at least in part on one or more unmap commands of the plurality of unmap commands being stored in the first queue for the threshold duration.

9. The memory system of claim 1, wherein the processing circuitry is further configured to cause the memory system to:
    identify, based at least in part on receiving the plurality of commands, the plurality of unmap commands within the plurality of commands, wherein the plurality of unmap commands is stored in the first queue based at least in part on identifying the plurality of unmap commands.

10. The memory system of claim 1, wherein the one or more messages comprise one or more DATA OUT universal flash storage protocol information units (UPIUs).

11. A non-transitory, computer-readable medium storing code comprising instructions which, when executed by processing circuitry of an electronic device, causes the electronic device to:
    receive a plurality of commands comprising a plurality of unmap commands interspersed with one or more second commands of a type different than the plurality of unmap commands;
    store the plurality of unmap commands in a first queue used for unmap commands and the one or more second commands in a second queue used for the one or more second commands;
    transmit a plurality of ready-to-transfer messages consecutively, the plurality of ready-to-transfer messages comprising a ready-to-transfer message for each unmap command of the plurality of unmap commands in the first queue;
    receive, in response to the plurality of ready-to-transfer messages, one or more messages comprising data for executing the plurality of unmap commands; and
    store, in at least a portion of a buffer used for unmap commands, the data for executing the plurality of unmap commands obtained from the one or more messages.

12. The non-transitory, computer-readable medium of claim 11, wherein the instructions, when executed by the processing circuitry of the electronic device, further cause the electronic device to:

transmit a second plurality of ready-to-transfer messages comprising a ready-to-transfer message for each second command of the one or more second commands, wherein a first order in which unmap commands of the plurality of unmap commands and second commands the one or more second commands are received is different than a second order in which corresponding ready-to-transfer messages of the plurality of ready-to-transfer messages for the plurality of unmap commands and the second plurality of ready-to-transfer messages for the one or more second commands are transmitted.

13. The non-transitory, computer-readable medium of claim 11, wherein the instructions, when executed by the processing circuitry of the electronic device, further cause the electronic device to:

determine that a quantity of unmap commands in the first queue satisfies a threshold, wherein the plurality of ready-to-transfer messages for the plurality of unmap commands is transmitted based at least in part on the quantity of unmap commands satisfying the threshold.

14. The non-transitory, computer-readable medium of claim 11, wherein the instructions, when executed by the processing circuitry of the electronic device, further cause the electronic device to:

determine that the plurality of unmap commands has been stored in the first queue for a threshold duration, wherein the plurality of ready-to-transfer messages for the plurality of unmap commands is transmitted based at least in part on one or more unmap commands of the plurality of unmap commands being stored in the first queue for the threshold duration.

15. The non-transitory, computer-readable medium of claim 12, wherein the instructions to transmit the plurality of ready-to-transfer messages for the plurality of unmap commands, when executed by the processing circuitry of the electronic device, cause the electronic device to:

transmit the plurality of ready-to-transfer messages for the plurality of unmap commands before the second plurality of ready-to-transfer messages for the one or more second commands.

16. The non-transitory, computer-readable medium of claim 11, wherein the one or more messages comprises a single message comprising the data corresponding to the plurality of ready-to-transfer messages.

17. The non-transitory, computer-readable medium of claim 11, wherein the one or more messages comprises a plurality of messages comprising the data in a plurality of data packets, the plurality of messages corresponding to the plurality of ready-to-transfer messages.

18. The non-transitory, computer-readable medium of claim 11, wherein multiple ready-to-transfer messages of the plurality of ready-to-transfer messages are transmitted prior to receiving a message of the one or more messages.

19. The non-transitory, computer-readable medium of claim 11, the instructions, when executed by the processing circuitry of the electronic device, further cause the electronic device to:

identify, based at least in part on receiving the plurality of commands, the plurality of unmap commands within the plurality of commands, wherein the plurality of unmap commands is stored in the first queue based at least in part on identifying the plurality of unmap commands.

20. The non-transitory, computer-readable medium of claim 11, wherein the one or more messages comprise one or more DATA OUT universal flash storage protocol information units (UPIUs).

21. A method, comprising:

receiving a plurality of commands comprising a plurality of unmap commands interspersed with one or more second commands of a type different than the plurality of unmap commands;

storing the plurality of unmap commands in a first queue used for unmap commands and the one or more second commands in a second queue used for the one or more second commands;

transmitting a plurality of ready-to-transfer messages consecutively, the plurality of ready-to-transfer messages comprising a ready-to-transfer message for each unmap command of the plurality of unmap commands in the first queue;

receiving, in response to the plurality of ready-to-transfer messages, one or more messages comprising data for executing the plurality of unmap commands; and storing, in at least a portion of a buffer used for unmap commands, the data for executing the plurality of unmap commands obtained from the one or more messages.

* * * * *